United States Patent
Ryu et al.

(10) Patent No.: US 9,314,745 B2
(45) Date of Patent: Apr. 19, 2016

(54) POROUS MEMBRANE AND METHOD FOR MANUFACTURING THE SAME

(71) Applicant: KOLON INDUSTRIES, INC., Gyeonggi-do, Gwacheon-si (KR)

(72) Inventors: Jae Hee Ryu, Seoul (KR); Yong-Cheol Shin, Seoul (KR); Jae Hun Lee, Yongin-si (KR)

(73) Assignee: KOLON INDUSTRIES, INC., Gwacheon-Si (KR)

( * ) Notice: Subject to any disclaimer, the term of this patent is extended or adjusted under 35 U.S.C. 154(b) by 102 days.

(21) Appl. No.: 14/380,551

(22) PCT Filed: Mar. 28, 2013

(86) PCT No.: PCT/KR2013/002583
§ 371 (c)(1),
(2) Date: Aug. 22, 2014

(87) PCT Pub. No.: WO2013/147525
PCT Pub. Date: Oct. 3, 2013

(65) Prior Publication Data
US 2015/0298067 A1 Oct. 22, 2015

(30) Foreign Application Priority Data
Mar. 30, 2012 (KR) .......................... 10-2012-0033540

(51) Int. Cl.
*B01D 39/00* (2006.01)
*B01D 39/14* (2006.01)
*B01D 71/26* (2006.01)
(Continued)

(52) U.S. Cl.
CPC ................ *B01D 71/34* (2013.01); *B01D 63/06* (2013.01); *B01D 67/0016* (2013.01); *B01D 67/0079* (2013.01); *B01D 69/02* (2013.01); *B01D 69/087* (2013.01); *B01D 69/148* (2013.01); *B01D 71/028* (2013.01); *B01D 2325/02* (2013.01);
(Continued)

(58) Field of Classification Search
CPC .... B01D 69/10; B01D 67/0079; B01D 71/34; B01D 67/0016; B01D 69/02; B01D 69/148; B01D 71/028
See application file for complete search history.

(56) References Cited

U.S. PATENT DOCUMENTS 6,680,013 B1 * 1/2004 Stein ..................... B29C 67/202
264/44
7,943,543 B1 5/2011 Liu et al.
(Continued)

FOREIGN PATENT DOCUMENTS

| CN | 101613482 A | 12/2009 |
|---|---|---|
| CN | 101720257 A | 6/2010 |

(Continued)

OTHER PUBLICATIONS

International Searching Authority, International Search Report for PCT/KR2013/002583, dated Jul. 9, 2013 (PCT ISA 210).

*Primary Examiner* — Ana Fortuna
(74) *Attorney, Agent, or Firm* — Sughrue Mion, PLLC

(57) ABSTRACT

Disclosed are a porous membrane having improved water permeability and elongation at break as well as high mechanical strength and impurity rejection rate and a method for manufacturing the same. The porous membrane of the present invention comprises a symmetric bead structure comprising a plurality of spherical crystallites. Each of the plurality of spherical crystallites comprises a plurality of sub-spherical crystallites.

14 Claims, 4 Drawing Sheets

(51) Int. Cl.
  *B01D 71/34* (2006.01)
  *B01D 67/00* (2006.01)
  *B01D 69/02* (2006.01)
  *B01D 69/08* (2006.01)
  *B01D 69/14* (2006.01)
  *B01D 71/02* (2006.01)
  *B01D 63/06* (2006.01)
(52) U.S. Cl.
  CPC ......... *B01D 2325/20* (2013.01); *B01D 2325/24* (2013.01)

(56) References Cited

U.S. PATENT DOCUMENTS

| | | | | |
|---|---|---|---|---|
| 8,308,850 | B2* | 11/2012 | Olschimke | B01D 53/1456 423/240 R |
| 8,445,096 | B2* | 5/2013 | Muromachi | B60J 1/00 428/156 |
| 8,739,978 | B2* | 6/2014 | Yoon | B01D 69/08 210/500.23 |
| 8,993,053 | B2* | 3/2015 | Jeong | B01D 61/025 210/500.38 |
| 9,010,547 | B2* | 4/2015 | Chu | B01D 67/0013 210/500.29 |
| 9,034,189 | B2* | 5/2015 | Ryu | B01D 63/021 210/321.81 |
| 2002/0011443 | A1 | 1/2002 | Komatsu et al. | |
| 2006/0049102 | A1* | 3/2006 | Miller | B01D 71/82 210/500.27 |
| 2009/0078640 | A1* | 3/2009 | Chu | B01D 67/0013 310/321.6 |
| 2009/0110932 | A1 | 4/2009 | Yang et al. | |
| 2009/0169884 | A1 | 7/2009 | Ekiner et al. | |
| 2009/0283469 | A1 | 11/2009 | Ariji et al. | |
| 2010/0119736 | A1 | 5/2010 | Yan et al. | |
| 2011/0155659 | A1 | 6/2011 | Yoon et al. | |
| 2012/0156389 | A1 | 6/2012 | Kotov | |
| 2015/0037507 | A1* | 2/2015 | Bockmeyer | C03C 17/42 427/407.2 |
| 2015/0298067 | A1* | 10/2015 | Ryu | B01D 71/34 210/500.25 |

FOREIGN PATENT DOCUMENTS

| | | |
|---|---|---|
| CN | 101780378 A | 7/2010 |
| JP | 2003-320228 A | 11/2003 |
| JP | 2006-326497 A | 12/2006 |
| JP | 2010-75851 A | 4/2010 |
| JP | 2010-227757 A | 10/2010 |
| KR | 1020100036045 A | 4/2010 |
| KR | 10-2010-0116257 A | 11/2010 |
| WO | 9322034 A1 | 11/1993 |
| WO | 2011/026104 A2 | 3/2011 |

* cited by examiner

POROUS MEMBRANE AND METHOD FOR MANUFACTURING THE SAME

TECHNICAL FIELD

The present invention relates to a porous membrane and a method for manufacturing the same, and more particularly, to a porous membrane having improved water permeability and elongation at break as well as high mechanical strength and impurity rejection rate, and a method for manufacturing the same.

BACKGROUND ART

A separation method using a filtering membrane has a lot of advantages over a separation method based on heating or phase-changing. Among the advantages is the high reliability of water treatment since the water of desired purity can be easily and stably satisfied by adjusting the size of the pores of the filtering membrane. Furthermore, since the separation method using a filtering membrane does not require a heating process, the membrane can be used with microorganisms which are useful for separation process but may be adversely affected by heat.

The separation method may comprise a flat-type membrane and a hollow fiber membrane. Since a hollow fiber membrane module performs a separation process by means of a bundle of hollow fiber membranes, it is more advantageous than a flat-type membrane in terms of an effective area used for the separation process.

Typically, the hollow fiber membrane has been widely used in the field of microfiltration and ultrafiltration for obtaining axenic water, drinking water, super pure water, and so on. Recently, however, application of the hollow fiber membrane is being expanded to include wastewater treatment, solid-liquid separation in a septic tank, removal of suspended solid (SS) from industrial wastewater, filtration of river, filtration of industrial water, and filtration of swimming pool water.

The hollow fiber membrane may be classified into a composite membrane which is manufactured by coating a tubular braid woven by polyester or polyamide fiber with a polymer resin film; and a single-layer membrane which is manufactured only with polymer resin without a reinforcing member such as a tubular braid.

Since the composite membrane comprises the tubular braid as a reinforcing member, it has relatively good mechanical property (strength and elongation). However, since the material of the tubular braid is different from that of the film coated thereon, their adhesive strength is weak. Thus, if a physical impact, e.g., impact by bubbles for aeration cleaning, is continuously applied to the composite membrane, the tubular braid and the film coated thereon might be separated from each other and the quality of the filtrate produced through the water treatment might be lowered. Further, due to the thickness of the tubular braid, it is impossible to reduce the total thickness of the composite membrane below a certain value, which makes the composite membrane more disadvantageous in terms of the effective filtration area. For these reasons, a single-layer membrane is more actively studied than a composite membrane nowadays.

Generally, a single-layer membrane can be manufactured by means of NIPS (Non-solvent Induced Phase Separation) or TIPS (Thermally Induced Phase Separation).

According to the NIPS, a single-layer membrane is manufactured by using a method comprising the steps of: preparing a spinning solution by dissolving polymer resin in a good solvent; extruding the prepared spinning solution through a spinneret; and inducing coagulation of the spinning solution by bringing the extruded spinning solution into contact with a solution including a non-solvent.

The porous membrane manufactured in accordance with the NIPS has insufficient mechanical strength because it has asymmetric sponge structure including macro voids. Due to the low mechanical strength, the porous membrane cannot satisfy the compaction index of 0.5 or less which is generally required in this technical field. That is, if a certain level of pressure is applied to the porous membrane, the membrane is seriously shrunk so that its pores are distorted and finally plugged up. As a result, the water permeability of the porous membrane becomes considerably lower. Additionally, the porous membrane prepared in accordance with the NIPS has a problem of low rejection rate with respect to impurities due to its large nominal pore size.

The term "macro void", as used herein, refers to a pore whose circumcircle has a diameter of 50 μm or more, and the term "sponge structure", as used herein, refers to a three-dimensional net structure of solids. The sponge structure has pores separated from each other by the solids constituting the net structure.

On the other hand, according to the TIPS, a single-layer membrane is manufactured by using a method comprising the steps of: preparing a spinning solution by forcibly dissolving polymer resin in a poor solvent at a temperature above the phase-separation temperature, extruding the prepared spinning solution through a spinneret; and coagulating the spinning solution by bringing the extruded spinning solution into contact with a cooling solution of a temperature below the phase-separation temperature.

As illustrated in FIG. 1, the porous membrane manufactured in accordance with the TIPS includes no macro voids and has symmetric bead structure which is symmetric in a membrane-thickness direction. Thus, the porous membrane manufactured in accordance with the TIPS is more advantageous than the porous membrane manufactured in accordance with NIPS in terms of mechanical strength and impurity rejection rate.

The term "bead structure", as used herein, refers to a structure including a plurality of spherical crystallites, i.e., solids of spherical or sphere-like shape, which are directly connected with one another or are indirectly connected with one another through stem-shaped solids. The term "symmetric bead structure", as used herein, refers to a bead structure having no substantial difference between the outer and inner portions of a membrane.

In spite of the aforementioned advantages of the bead structure, however, the porous membrane manufactured in accordance with the TIPS does not have competitive water permeability and elongation at break due to its dense structure, a typical characteristic of the bead structure. The low water permeability reduces the filtration capacity of the porous membrane, and the low elongation at break increases the risk that the membrane would be damaged during an aeration cleaning process for preventing the membrane from being fouled.

DISCLOSURE

Technical Problem

Therefore, the present invention is directed to a porous membrane and a method for manufacturing the same capable of preventing these limitations and drawbacks of the related art.

An aspect of the present invention is to provide a porous membrane having improved water permeability and elongation at break as well as high mechanical strength and impurity rejection rate.

Another aspect of the present invention is to provide a method for manufacturing a porous membrane having improved water permeability and elongation at break as well as high mechanical strength and impurity rejection rate.

Additional advantages, objects, and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof.

Technical Solution

In accordance with the one aspect of the present invention, there is provided a porous membrane comprising a symmetric bead structure comprising a plurality of spherical crystallites, wherein each of the plurality of spherical crystallites comprises a plurality of sub-spherical crystallites.

In accordance with another aspect of the present invention, there is provided a method for manufacturing a porous membrane, the method comprising: dissolving at least one polymer selected from the group consisting of polyethersulfone, polysulfone, and polyvinylidene difluoride in a poor solvent to prepare a basic solution; adding an ionic liquid to the basic solution to prepare a spinning dope; extruding the spinning dope through a spinneret; and bringing the extruded spinning dope into contact with a coagulation solution so as to form a porous structure.

The general description provided above and the detailed description provided below are provided only for illustration of the present invention and be construed as providing a more detailed description of inventions defined in claims.

Advantageous Effect

According to the present invention, the improvement of the overall filtration capacity of the porous membrane can be guaranteed since the membrane has high impurity rejection rate as well as good water permeability.

Further, since the porous membrane of the present invention has high tensile strength, it can satisfy the compaction index of 0.5 or less which is generally required in this technical field. In other words, the shapes of the pores of the membrane are maintained even under high pressure so that the high water permeability also can be maintained. As a result, the porous membrane according to the present invention can facilitate stable control of the permeate flux.

Additionally, since the porous membrane according to the present invention has high elongation at break, it can remarkably reduce the risk of being damaged during an aeration cleaning process for preventing the membrane from being fouled.

Other advantages of the present invention will be described below in detail together with the related technical features.

DESCRIPTION OF DRAWINGS

The above and other objects, features and other advantages of the present invention will be more clearly understood from the following detailed description taken in conjunction with the accompanying drawings, in which.

MODE FOR INVENTION

The term "water permeability", as used herein, refers to an amount (ml) of pure water passing through a unit surface area of a porous membrane for a unit period of time when a unit pressure is applied to the porous membrane, and the unit of water permeability is $(ml/cm^2) \cdot (min)^{-1} \cdot (kgf/cm^2)^{-1}$.

The term "compaction index" is defined or calculated by an equation of "$CI=(Lp_{1.0}-Lp_{3.0})/Lp_{1.0}$" wherein 'CI' represents the compaction index, '$Lp_{1.0}$' represents water permeability of the porous membrane measured under a nitrogen pressure of $1.0$ $kgf/cm^2$, and '$Lp_{3.0}$' represents water permeability of the porous membrane measured under a nitrogen pressure of $3.0$ $kgf/cm^2$. The compaction index indicates a distortion level of a membrane caused by the increase of the pressure. Generally, the higher the tensile strength of the membrane is, the lower the compaction index of the membrane is.

Hereinafter, the porous membrane according to the embodiments of the present invention will be described in detail with reference to the FIGS. 2 to 4.

Figure 1:
FIG. 1 is a scanning electron microscope (SEM) image showing a cross section of the porous membrane of the related art produced according to TIPS, taken at 1000×.
Figure 2:
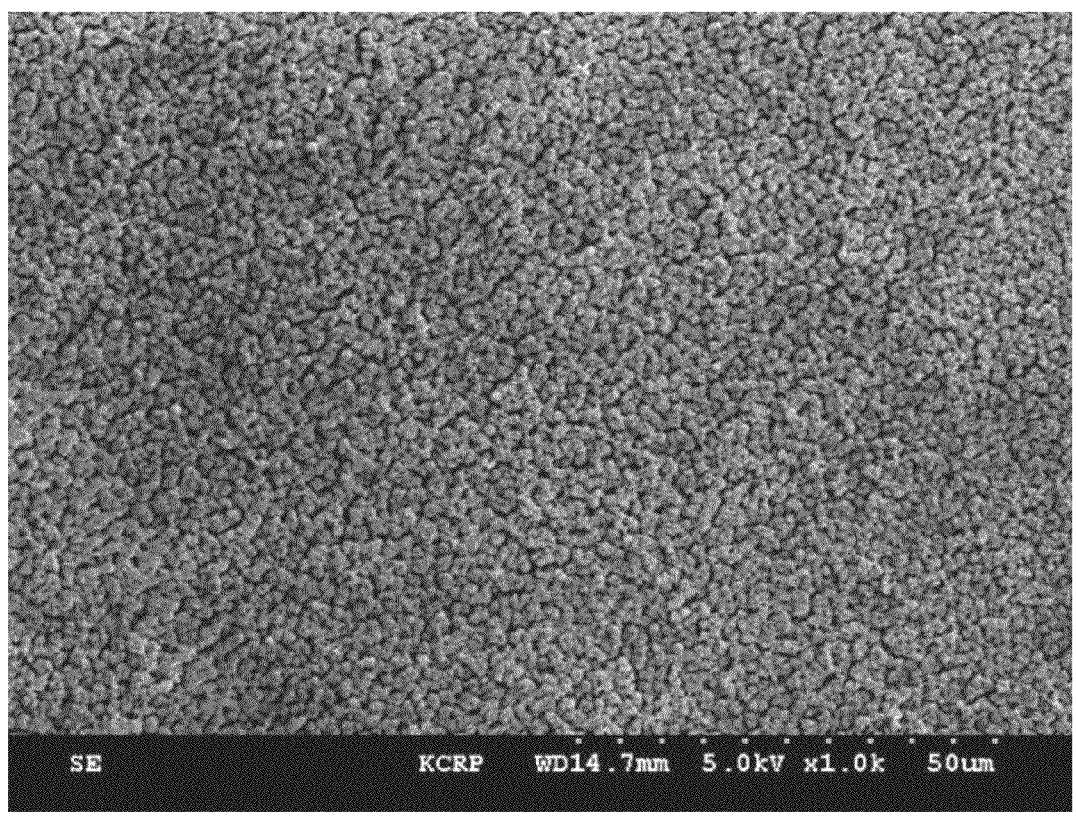
FIGS. 2 to 4 are SEM images showing cross sections of the porous membrane manufactured according to one embodiment of the present invention, taken at 1000×, 5000×, and 20000× respectively.
Figure 3:
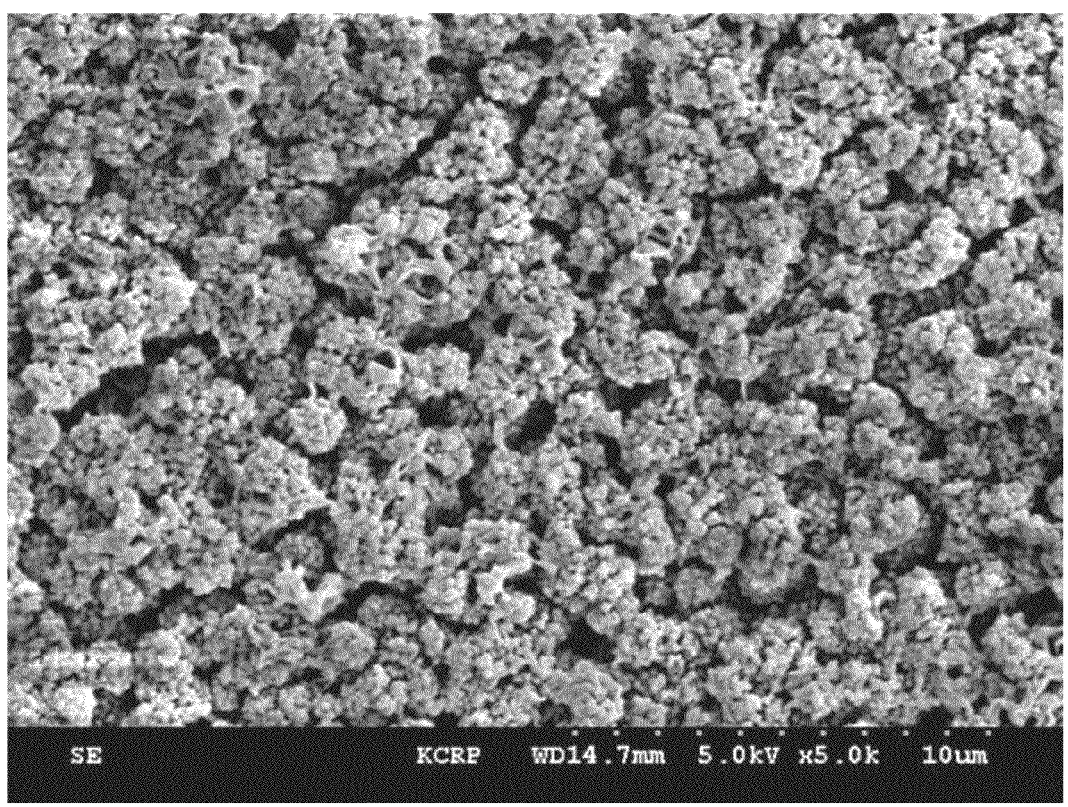
Figure 4:
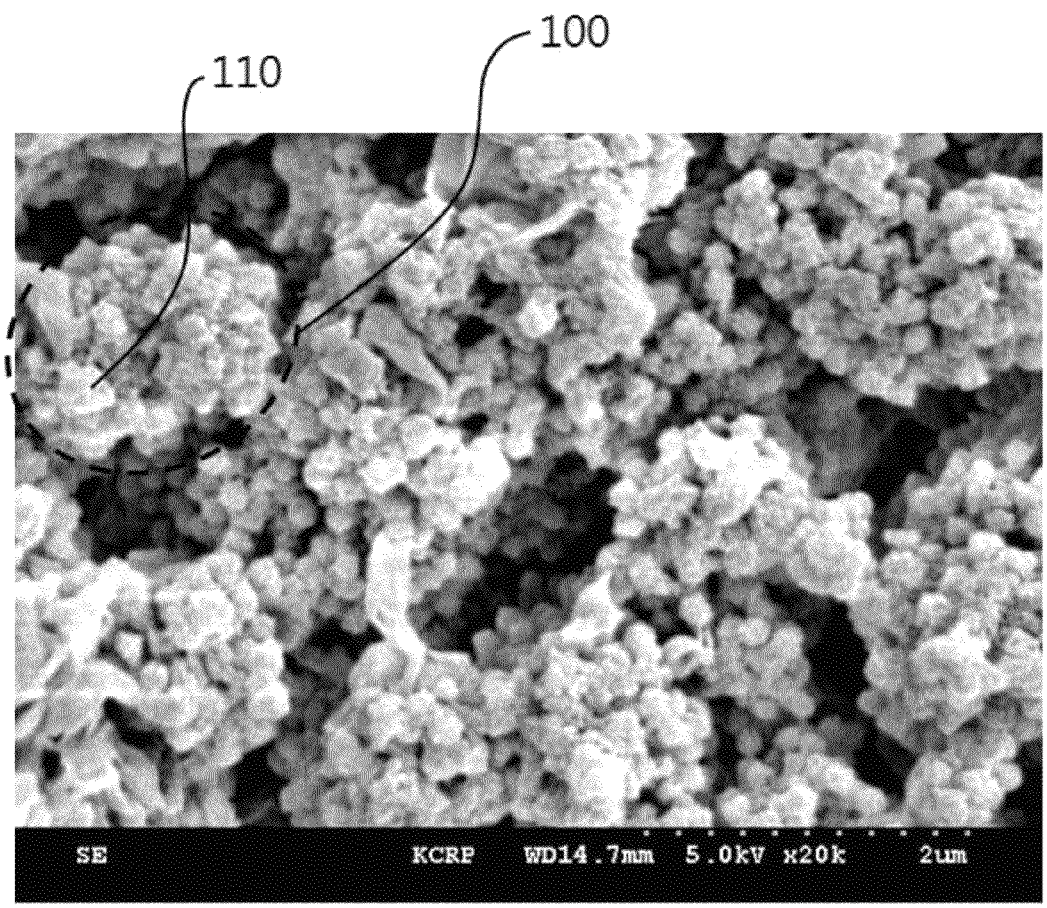

FIGS. 2 to 4 are SEM images showing cross sections of the porous membrane manufactured according to one embodiment of the present invention, taken at 1000×, 5000×, and 20000× respectively.

As illustrated in FIGS. 2 to 4, the porous membrane of the present invention has a symmetric bead structure comprising a plurality of spherical crystallites 100. Owing to the symmetric bead structure, the porous membrane of the present invention is superior to the porous membrane of sponge structure in terms of mechanical strength and impurity rejection rate.

The plurality of spherical crystallites 100 may comprise at least one of polyethersulfone (PES), polysulfone (PS), and polyvinylidene difluoride (PVDF). According to one embodiment of the present invention, the plurality of spherical crystallites 100 comprise polyvinylidene difluoride.

Optionally, the plurality of spherical crystallites 100 may further comprise zeolite.

Each of the plurality of spherical crystallites 100 constituting the bead structure comprises a plurality of sub-spherical crystallites 110. Since the spherical crystallites 100 directly connected with one another or indirectly connected with one another through stem-shaped solids comprise a plurality of sub-spherical crystallites 110, the porous membrane of the present invention has higher porosity than the conventional porous membrane consisting of spherical crystallites none of which comprise sub-spherical crystallites. Consequently, the porous membrane of the present invention has higher water permeability and higher elongation at break than the conventional porous membrane having a bead structure.

Owing to the symmetric bead structure comprising spherical crystallites 100 including a plurality of sub-spherical crystallites 110, the porous membrane according to the one embodiment of the present invention has high water permeability of $0.7$ $(ml/cm^2) \cdot (min)^{-1} \cdot (kgf/cm^2)^{-1}$ or more and low compaction index of 0.5 or less. The water permeability is measured under nitrogen pressure of 1.0 to 3.0 $kgf/cm^2$. The compaction index means a distortion level of a membrane caused by the increase of the pressure and is defined by a following equation:

$$CI=(Lp_{1.0}-Lp_{3.0})/Lp_{1.0} \quad \text{[Equation] 5}$$

wherein 'CI' represents the compaction index, '$Lp_{1.0}$' represents water permeability of the porous membrane measured under a nitrogen pressure of 1.0 kgf/cm$^2$, and '$Lp_{3.0}$' represents water permeability of the porous membrane measured under a nitrogen pressure of 3.0 kgf/cm$^2$.

The porous membrane according to the one embodiment of the present invention has tensile strength of 0.7 kgf/fiber or more, elongation at break of 50% or more, and rejection rate of 90% or more with respect to particles having a diameter of about 0.1 µm.

Hereinafter, a method for manufacturing a porous membrane according to one embodiment of the present invention will be described in detail.

First, a polymer is dissolved in a poor solvent to prepare a basic solution.

The polymer used for producing the porous membrane may comprise at least one of polyethersulfone (PES), polysulfone (PS), and polyvinylidene difluoride (PVDF). Among them, PVDF is preferable since it has good resistance to an oxidizing atmosphere including ozone which is widely used for sterilization of water. Further, PVDF is resistant to most of inorganic and organic acids, aliphatic and aromatic hydrocarbons, alcohol, and halide solvents.

The poor solvent is a solvent which is not capable of dissolving the polymer at an ambient temperature and can dissolve the polymer only when heated to high temperature. The polymer is dissolved in the poor solvent at a temperature of 100° C. or more but below a boiling point of the poor solvent.

The poor solvent according to the one embodiment of the present invention comprises at least one of cyclohexanone, isophorone, γ-butyrolactone, methyl isoamyl ketone, dimethyl phthalate, propylene glycol methyl ether, propylene carbonate, diacetone alcohol, and glycerol triacetate.

The concentration of the polymer in the basic solution needs to be determined based on the required strength and water permeability of the porous membrane. According to one embodiment of the present invention, the basic solution comprises 20 to 40% by weight of the polymer and 60 to 80% by weight of the poor solvent. If the concentration of the polymer is less than 20% by weight, it is difficult to obtain a form of a porous membrane and, even if the porous membrane form could be obtained, the strength thereof would be too low. On the other hand, if the concentration of the polymer is more than 40% by weight, it is difficult to perform the spinning process with such solution, it is required to raise the temperature of the polymer and poor solvent too high to prepare such solution, and the porous membrane produced from such solution has low porosity and low water permeability as well.

The inventors of the present invention conceived that a porous membrane needs to have a bead structure rather than a sponge structure to have high mechanical strength and high impurity rejection rate, and thus, reached a conclusion that the porous membrane has to be manufactured according to TIPS rather than NIPS.

Further, it is believed that, if each of the spherical crystallites is formed of a plurality of small sub-spherical crystallites, the porosity of the porous membrane can be increased and thus the typical disadvantage of the bead structure (i.e., low water permeability and low elongation at break due to the dense structure) can be overcome.

Based on the aforementioned belief, a research about how to make the spherical crystallites of a bead structure each of which comprises a plurality of small sub-spherical crystallites was performed, and it was finally discovered that some changes of the bead structure are caused when an ionic liquid is added to the basic solution and the resulting solution rather than the basic solution itself is used as a spinning dope.

In other words, if the basic solution itself is used as a spinning dope as usual, none of the spherical crystallites of the resulting porous membrane comprises a plurality of sub-spherical crystallites. However, it has been surprisingly discovered that, if an ionic liquid is added to the basic solution and the resulting solution is used as a spinning dope, each of the spherical crystallites of the resulting porous membrane is formed of a plurality of sub-spherical crystallites.

Thus, according to the present invention, an ionic liquid, e.g., 1-butyl-3-methylimidazolium tetrafluoroborate (BMIM-BF$_4$), is added to the basic solution to prepare a spinning dope. According to one embodiment of the present invention, the spinning dope is prepared by adding the ionic liquid to the basic solution in an amount of 2 to 20% by weight based on total weight of the polymer, for example, polyvinylidene difluoride.

Optionally, a crystalline inorganic substance, e.g., zeolite, may be further added to the basic solution so that the formation of the sub-spherical crystallites can be promoted. The content of the crystalline inorganic substance in the spinning dope may be 5 to 20% by weight. If the content of the crystalline inorganic substance is less than 5% by weight, it cannot provide any substantial assistance for the formation of the pores of the porous membrane. On the other hand, if the content of the crystalline inorganic substance is more than 20% by weight, the phase separation of the spinning dope takes place so rapidly that it is required to maintain the spinning dope at high temperature until the spinning process is carried out, and the membrane formed during the spinning process can even be cut.

The spinning dope prepared as such is extruded through a double tube-type spinneret at about 10 to 30 g/min speed. At the same time, a solution including 500 to 100% by weight of glycerin and 50 to 0% by weight of pure water is extruded through a slit of the spinneret to form a lumen of the porous membrane.

The spinning dope extruded from the spinneret is submerged into a coagulation solution including a non-solvent in a coagulation bath via an air gap, and then coagulated. The air gap may be an air layer or an inert gas layer, and the length of the air gap may be 5 to 30 cm.

The coagulation solution existing in the coagulation bath and inducing the coagulation of the spinning dope may comprise 20 to 80% by weight of water and 20 to 80% by weight of volatile organic solvent. The volatile organic solvent comprises at least one of methanol, ethanol, isopropyl alcohol, acetone, butanone (methyl ethyl ketone), diacetyl, acetylacetone, hexane-2,5-dione, diethyl ether, diisopropyl ether, and polyether.

According to one embodiment of the present invention, the temperature of the coagulation solution is maintained at 5 to 20° C. If the temperature of the coagulation solution is lower than 5° C., the water permeability of the membrane is lowered. On the other hand, if the temperature of the coagulation solution is higher than 20° C., the mechanical strength of the membrane is lowered.

The spinning dope extruded from the spinneret is coagulated through the solid-liquid phase separation while sequentially passing through the air gap and coagulation solution, and forms a porous structure having a shape of a hollow fiber membrane.

Subsequently, the porous structure is cleaned with pure water in order to remove any solvent and additive which might remain on the porous structure. That is, during the cleaning process, the poor-solvent, ionic liquid and the like are removed from the porous structure. According to one embodiment of the present invention, the cleaning bath for the cleaning process is maintained at 5 to 20° C.

After the porous structure coagulated in the coagulation bath is cleaned with pure water, it is heat-treated in a bath the temperature of which is kept at about 60 to 120° C. for 10 to 30 hours, and then dried to complete the porous membrane. If the heat treatment is carried out for less than 10 hours, the heat treatment is insufficient and the mechanical strength of the final porous membrane is unsatisfactory. On the other hand, if the heat treatment is carried out for more than 30 hours, the membrane structure becomes too dense and thus the water permeability of the membrane is lowered.

Optionally, a wetting process may be performed after the porous membrane is cleaned with the pure water since, if the final porous membrane has low initial wetness, its water permeability at the initial stage of the water treatment would be unsatisfactory. According to one embodiment of the present invention, the wetting process is carried out by submerging the porous structure in a wetting solution for 3 to 5 hours. Optionally, the wetting process may be performed by spraying the wetting solution onto the porous structure.

According to one embodiment of the present invention, the wetting solution comprises at least one of glycerin, polyethylene glycol, and polypropylene glycol. The wetting solution may further comprise water and/or ethanol. In this case, the content of the water and/or ethanol in the wetting solution is 10 to 50% by weight.

After the wetting process, the drying and heat treatment processes are performed. For example, the porous membrane may be heat-treated in an oven at 50 to 120° C. for 1 to 5 hours. If the heat treatment is carried out for less than 1 hour, the heat treatment effect is insufficient and thus the mechanical strength of the resulting porous membrane is unsatisfactory. On the other hand, if the heat treatment is carried out for more than 5 hours, the membrane structure becomes too dense and thus the water permeability of the membrane is lowered.

Because the tube-type porous membrane manufactured according to one embodiment of the present invention has a bead structure as a whole from the inner surface to the outer surface, it has good strength property. Further, since each of the spherical crystallites is formed of a plurality of sub-spherical crystallites, the porous membrane has high water permeability and high elongation at break.

Hereinafter, the examples of the present invention and comparative example will be described to explain the present invention in detail. Since the following examples are provided only for easy understanding of the present invention, the scope of the present invention should not be limited thereto.

Example 1

Polyvinylidene fluoride (PVDF) was dissolved in γ-butyrolactone at a temperature above 100° C. to prepare a basic solution. The content of the PVDF in the basic solution was 30% by weight and the content of the γ-butyrolactone was 70% by weight. 1-butyl-3-methylimidazolium tetrafluoroborate (BMIM-BF$_4$) was added as an ionic liquid to the basic solution to prepare a spinning dope. The amount of the BMIM-BF$_4$ added to the basic solution was 5% of the weight of the PVDF.

The resulting spinning dope was extruded through a double tube type spinneret. A solution including 80% by weight of glycerin and 20% by weight of pure water was extruded through the slit of the spinneret to form a lumen of the porous membrane.

The extruded spinning dope passed through an air gap having a length of 30 cm, and then submerged in a coagulation solution in a coagulation bath. The coagulation solution, a mixture including 80% by weight of pure water and 20% by weight of ethanol, was maintained at about 10° C.

After the porous structure formed as a result of the coagulation was cleaned with pure water, it was cleaned with hot water at about 120° C. Subsequently, the porous structure was submerged in a wetting solution for 6 hours, and then dried at about 80° C. to complete a porous membrane.

Example 2

A porous membrane was made in the same manner as that of the Example 1 except that the amount of the BMIM-BF$_4$ added to the basic solution was 2% of the weight of the PVDF.

Comparative Example

A porous membrane was made in the same manner as that of the Example 1 except that the BMIM-BF$_4$ was not added to the basic solution.

A variety of properties of the porous membranes finally obtained in the examples and comparative example, i.e., water permeability (Lp), compaction index, elongation at break, tensile strength, and rejection rate with respect to particles having a diameter of 0.1 μm, were measured and/or calculated in accordance with the following methods, and the results thereof are shown in the following Table 1.

Water Permeability

Acryl tube having 10 mm diameter and 170 mm length, and the porous membrane were prepared. The porous membrane was cut to have 160 mm length, and an open end of the porous membrane was sealed by an adhesive. Then, after the porous membrane was inserted into the acryl tube, a space between the open end of the porous membrane and the corresponding end of the acryl tube was sealed. Subsequently, under an ambient temperature of about 25° C., pure water was introduced into the space between the inner wall of the acryl tube and the porous membrane via the other open end of the acryl tube, and nitrogen pressure of 1.0 kgf/cm$^2$ was applied thereto. The water permeability ($Lp_{1.0}$) under the nitrogen pressure of 1.0 kgf/cm$^2$ was calculated by the following equation 1:

$$Lp = V/(S \cdot t \cdot P) \quad \text{[Equation 1]}$$

Wherein 'Lp' represents the water permeability of the porous membrane, 'V' represents the amount (ml) of the filtrate passing through the porous membrane, 'S' represents the surface area (cm$^2$) of the porous membrane; 't' represents the permeation time (min); and 'P' represent the nitrogen pressure (kgf/cm$^2$).

Then, the water permeability ($Lp_{3.0}$) under the nitrogen pressure of 3.0 kgf/cm$^2$ was measured in the same method as described above.

Compaction Index

The compaction index of the porous membrane was calculated by the following equation 2.

$$CI = (Lp_{1.0} - Lp_{3.0})/Lp_{1.0} \quad \text{[Equation 2]}$$

wherein 'CI' represents the compaction index, '$Lp_{1.0}$' represents water permeability of the porous membrane measured under a nitrogen pressure of 1.0 kgf/cm$^2$, and '$Lp_{3.0}$' represents water permeability of the porous membrane measured under a nitrogen pressure of 3.0 kgf/cm$^2$.

Elongation at Break

A universal testing machine (Instron 4303) capable of measuring the mechanical properties such as elongation at break and compressive strength was used to measure the elongation at break of the porous membrane. The porous membrane was cut to have 120 mm length, and then it was held in a grip of a 10 N (1 kgf) cell at the both end portions thereof having 10 mm length. Subsequently, the porous membrane was pulled at a speed of 50 mm/min and the elongation thereof, i.e., the proportion of the increased length to the original length, was measured just before it was broken.

Tensile Strength

A universal testing machine (Instron 4303) capable of measuring the mechanical properties such as elongation at break and compressive strength was used to measure the elongation at break of the porous membrane. The porous membrane was cut to have 120 mm length, and then it was held in a grip of a 10 N (1 kgf) cell at the both end portions thereof having 10 mm length. Subsequently, the porous membrane was pulled at a speed of 50 mm/min and the breaking tenacity (kgf) thereof was measured.

Rejection Rate with Respect to Particles Having a Diameter of 0.1 μm

Acryl tube having 10 mm diameter and 170 mm length, and the porous membrane were prepared. The porous membrane was cut to have 160 mm length, and an open end of the porous membrane was sealed by an adhesive. Then, after the porous membrane was inserted into the acryl tube, a space between the open end of the porous membrane and the corresponding end of the acryl tube was sealed. Subsequently, a substrate containing 0.05 wt % of styrene beads was prepared by putting the styrene beads having a mean diameter of 0.1 μm into pure water. The substrate was introduced into the space between the inner wall of the acryl tube and the porous membrane via the other open end of the acryl tube. Subsequently, under an ambient temperature of about 25° C., a nitrogen pressure of 0.05 kgf/cm$^2$ was applied to the porous membrane for 1 minute to obtain the filtrate passing through the porous membrane. Then, the concentrations of the styrene beads of the substrate and filtrate were respectively measured by means of UV[UV-160A](at 460λ), and the rejection rate of the porous membrane was calculated by the following equation 3.

$$\text{Rejection rate}(\%) = \{(C_s - C_f)/C_s\} \times 100 \quad \text{[Equation 3]}$$

wherein '$C_s$' represents the concentration of styrene bead of the substrate, and '$C_f$' represents the concentration of styrene bead of the permeates.

TABLE 1

| | $Lp_{1.0}$ | $Lp_{3.0}$ | Compaction index | Elongation at break (%) | Tensile strength (Kgf/fiber) | Rejection rate (%) |
|---|---|---|---|---|---|---|
| Example 1 | 1.3 | 1.2 | 0.077 | 80 | 1.0 | 95 |
| Example 2 | 0.9 | 0.7 | 0.222 | 55 | 0.9 | 97 |
| Comparative example | 0.3 | 0.28 | 0.067 | 40 | 1.3 | 99 |

Those skilled in the art will appreciate that various modifications, additions and substitutions are possible, without departing from the scope and spirit of the invention. Accordingly, the present invention includes all alternations and modifications that fall within the scope of inventions described in claims and equivalents thereto.

The invention claimed is:

1. A porous membrane comprising a symmetric bead structure comprising a plurality of spherical crystallites,
    wherein each of the plurality of spherical crystallites comprises a plurality of sub-spherical crystallites.

2. The porous membrane of claim 1, wherein the plurality of spherical crystallites comprise polyvinylidene difluoride.

3. The porous membrane of claim 2, wherein the plurality of spherical crystallites further comprise zeolite.

4. The porous membrane of claim 1, wherein water permeability of the porous membrane measured under nitrogen pressure of 1.0 to 3.0 kgf/cm$^2$ is 0.7 (ml/cm$^2$)·(min)$^{-1}$·(kgf/cm$^2$)$^{-1}$ or more, and
    wherein compaction index of the porous membrane as defined by a following equation is 0.5 or less:

$$CI = (Lp_{1.0} - Lp_{3.0})/Lp_{1.0} \quad \text{[Equation]}$$

wherein 'CI' represents the compaction index, '$Lp_{1.0}$' represents water permeability of the porous membrane measured under a nitrogen pressure of 1.0 kgf/cm$^2$, and '$Lp_{3.0}$' represents water permeability of the porous membrane measured under a nitrogen pressure of 3.0 kgf/cm$^2$.

5. The porous membrane of claim 1, wherein the porous membrane has tensile strength of 0.7 kgf/fiber or more and elongation at break of 50% or more, and
    wherein rejection rate of the porous membrane with respect to particles having a diameter of 0.1 μm is 90% or more.

6. A method for manufacturing a porous membrane, the method comprising:
    dissolving at least one polymer selected from the group consisting of polyethersulfone, polysulfone, and polyvinylidene difluoride in a poor solvent to prepare a basic solution;
    adding an ionic liquid to the basic solution to prepare a spinning dope;
    extruding the spinning dope through a spinneret; and
    bringing the extruded spinning dope into contact with a coagulation solution so as to form a porous structure;
    wherein the membrane comprises a symmetric bead structure comprising a plurality of spherical crystallites, wherein each of the plurality of spherical crystallites comprises a plurality of sub-spherical crystallites.

7. The method of claim 6, wherein the at least one polymer is dissolved in the poor solvent at a temperature of 100° C. or more but below a boiling point of the poor solvent.

8. The method of claim 6, wherein the poor solvent comprises at least one of cyclohexanone, isophorone, γ-butyrolactone, methyl isoamyl ketone, dimethyl phthalate, propylene glycol methyl ether, propylene carbonate, diacetone alcohol, and glycerol triacetate.

9. The method of claim 8, wherein the poor solvent comprises γ-butyrolactone.

10. The method of claim 6, wherein the basic solution comprises 20 to 40% by weight of the at least one polymer and 60 to 80% by weight of the poor solvent, and
    wherein the spinning dope is prepared by adding the ionic liquid to the basic solution in an amount of 2 to 20% by weight based on total weight of the at least one polymer.

11. The method of claim 6, wherein the ionic liquid comprises 1-butyl-3-methylimidazolium tetrafluoroborate.

12. The method of claim 6, further comprising adding zeolite to the basic solution.

13. The method of claim 6, wherein the coagulation solution comprises 20 to 80% by weight of water and 20 to 80% by weight of a volatile organic solvent, and wherein the volatile organic solvent comprises at least one of methanol, ethanol, isopropyl alcohol, acetone, butanone, diacetyl, acetylacetone, hexane-2,5-dione, diethyl ether, diisopropyl ether, and polyether.

14. The method of claim 6, wherein a temperature of the coagulation solution is maintained at 5 to 20° C.

* * * * *